United States Patent
Khan et al.

(10) Patent No.: US 10,651,440 B1
(45) Date of Patent: May 12, 2020

(54) MOUNTING BRACKETS FOR A VEHICLE TRACTION BATTERY SYSTEM

(71) Applicant: Ford Global Technologies, LLC, Dearborn, MI (US)

(72) Inventors: Ahteram Khan, Canton, MI (US); Afif Sabbagh, Troy, MI (US); Jingmei Shen, Troy, MI (US); Dhia Meram, Sterling Heights, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/351,970

(22) Filed: Mar. 13, 2019

(51) Int. Cl.
| B60K 1/04 | (2019.01) |
| B60R 16/04 | (2006.01) |
| H01M 2/10 | (2006.01) |
| B60L 50/64 | (2019.01) |

(52) U.S. Cl.
CPC ............. H01M 2/1083 (2013.01); B60K 1/04 (2013.01); B60L 50/64 (2019.02); B60R 16/04 (2013.01)

(58) Field of Classification Search
CPC ... H01M 2/1083; H01M 2/1072; B60L 50/64; B60L 50/50; B60L 50/60; B60K 1/04; B60R 16/04
USPC ....................................................... 180/68.5
See application file for complete search history.

(56) References Cited

U.S. PATENT DOCUMENTS

| 7,281,696 | B2 * | 10/2007 | Kida | B60J 5/06 |
| | | | | 248/300 |
| 9,027,684 | B2 | 5/2015 | Araki | |
| 9,090,025 | B2 | 7/2015 | Balk | |
| 9,415,672 | B2 * | 8/2016 | Lee | B60K 1/04 |
| 9,457,652 | B2 * | 10/2016 | Sloan | B60K 15/07 |
| 2013/0119760 | A1 * | 5/2013 | Amano | B60R 16/0239 |
| | | | | 307/10.1 |
| 2017/0084890 | A1 | 3/2017 | Subramanian et al. | |
| 2019/0084441 | A1 | 3/2019 | Khan et al. | |

FOREIGN PATENT DOCUMENTS

DE    102015112088 A1    1/2017

* cited by examiner

*Primary Examiner* — John D Walters
(74) *Attorney, Agent, or Firm* — Brooks Kushman P.C.; David Kelley

(57) ABSTRACT

A mounting bracket is provided for a vehicle battery system with a battery tray sized to receive a traction battery. The bracket has first and second sides extending between first and second ends. The bracket defines first and second apertures adjacent to the first end and positioned to cooperate with the first and second bosses to connect the bracket to the battery tray. The bracket defines a third aperture adjacent to the second end and positioned to cooperate with a mounting point on a vehicle frame. The bracket defines a transverse slot intersecting the first side and extending towards the second side, with the transverse slot positioned between the first and third apertures. A vehicle and a vehicle battery system with the mounting bracket are also provided.

20 Claims, 4 Drawing Sheets

MOUNTING BRACKETS FOR A VEHICLE TRACTION BATTERY SYSTEM

TECHNICAL FIELD

Various embodiments relate to a vehicle traction battery mounting system, and mounting brackets for use with the system.

BACKGROUND

Vehicles may include one or more traction batteries, such as a high voltage battery, to provide electrical power for an electric machine or electric motor to propel the vehicle. The traction battery may be connected to the vehicle frame or body using a battery tray and mounting brackets.

SUMMARY

According to an embodiment, a vehicle battery system includes a battery tray sized to receive a traction battery and defining first and second bosses, and a bracket. The bracket has first and second sides extending between first and second ends. The bracket defines first and second apertures adjacent to the first end and positioned to cooperate with the first and second bosses to connect the bracket to the battery tray. The bracket defines a third aperture adjacent to the second end and positioned to cooperate with a mounting point on a vehicle frame. The bracket defines a transverse slot intersecting the first side and extending towards the second side, with the transverse slot positioned between the first and third apertures.

According to another embodiment, a vehicle is provided with a vehicle frame defining first and second mounting points, a battery tray, a first bracket, and a second bracket. The battery tray is sized to receive a traction battery and defines a first pair of bosses and a second pair of bosses. The first bracket has first and second sides extending between first and second ends. The first bracket defines a pair of apertures adjacent to the first end and positioned to cooperate with the first pair of bosses to connect the bracket to the battery tray. The first bracket defines another aperture adjacent to the second end and positioned to cooperate with the first mounting point. The first bracket defines a transverse slot intersecting the first side and extending towards the second side, with the transverse slot positioned between the pair of apertures and the another aperture. The second bracket has first and second sides extending between first and second ends. The second bracket defines a pair of apertures adjacent to the first end and positioned to cooperate with the first pair of bosses to connect the bracket to the battery tray. The second bracket defines another aperture adjacent to the second end and positioned to cooperate with the second mounting point.

According to yet another embodiment, a mounting bracket for a traction battery tray is provided with a member having first and second sides extending between first and second ends. The member defines a pair of apertures adjacent to the first end to connect the member to a battery tray, another aperture adjacent to the second end to connect the member to a vehicle frame, and a transverse slot intersecting the first side and extending towards the second side.

DETAILED DESCRIPTION

As required, detailed embodiments of the present disclosure are provided herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present disclosure.

Figure 1:
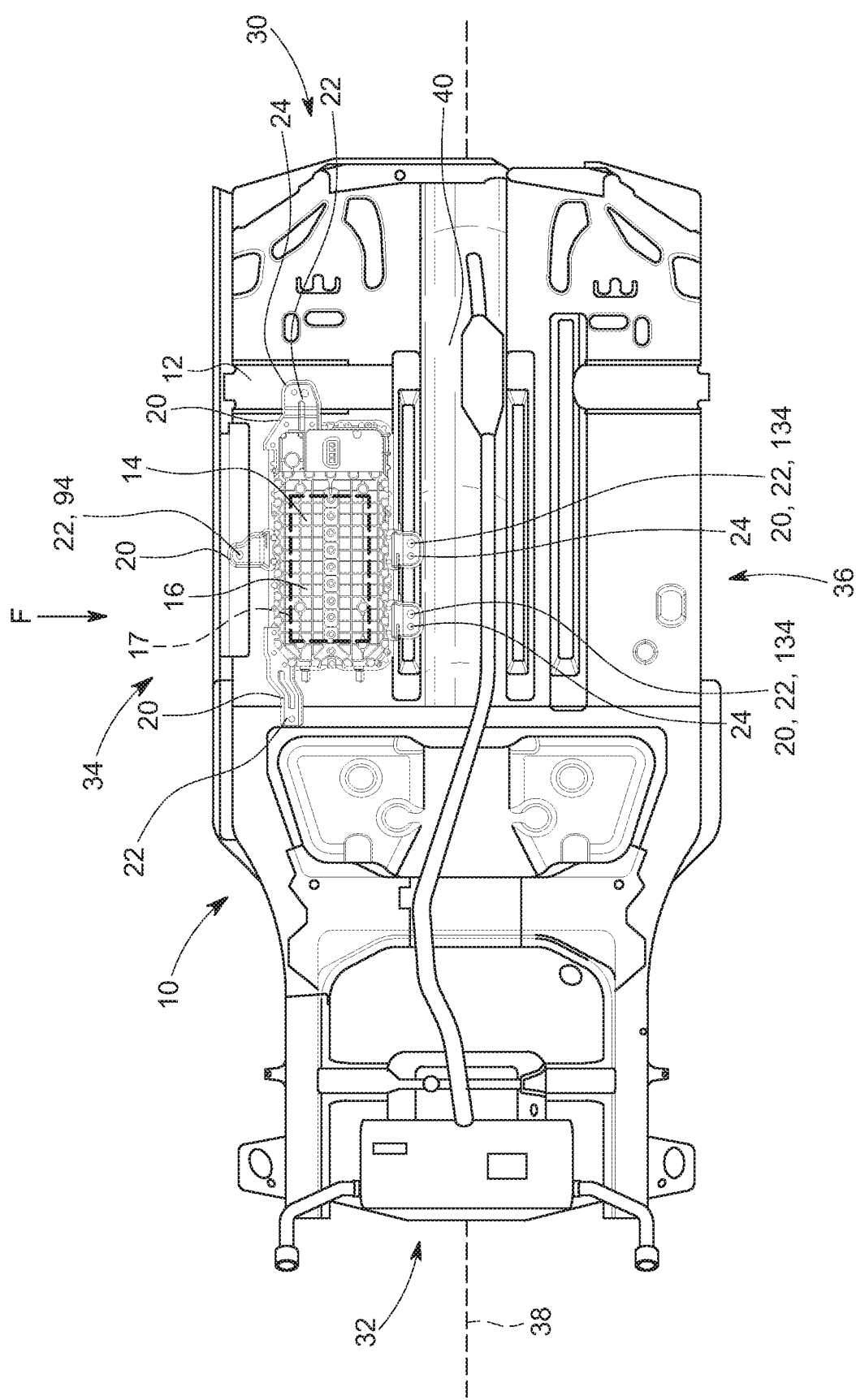
FIG. 1 is a partial perspective view of a battery mounting system on a vehicle frame according to an embodiment.
Figure 2:
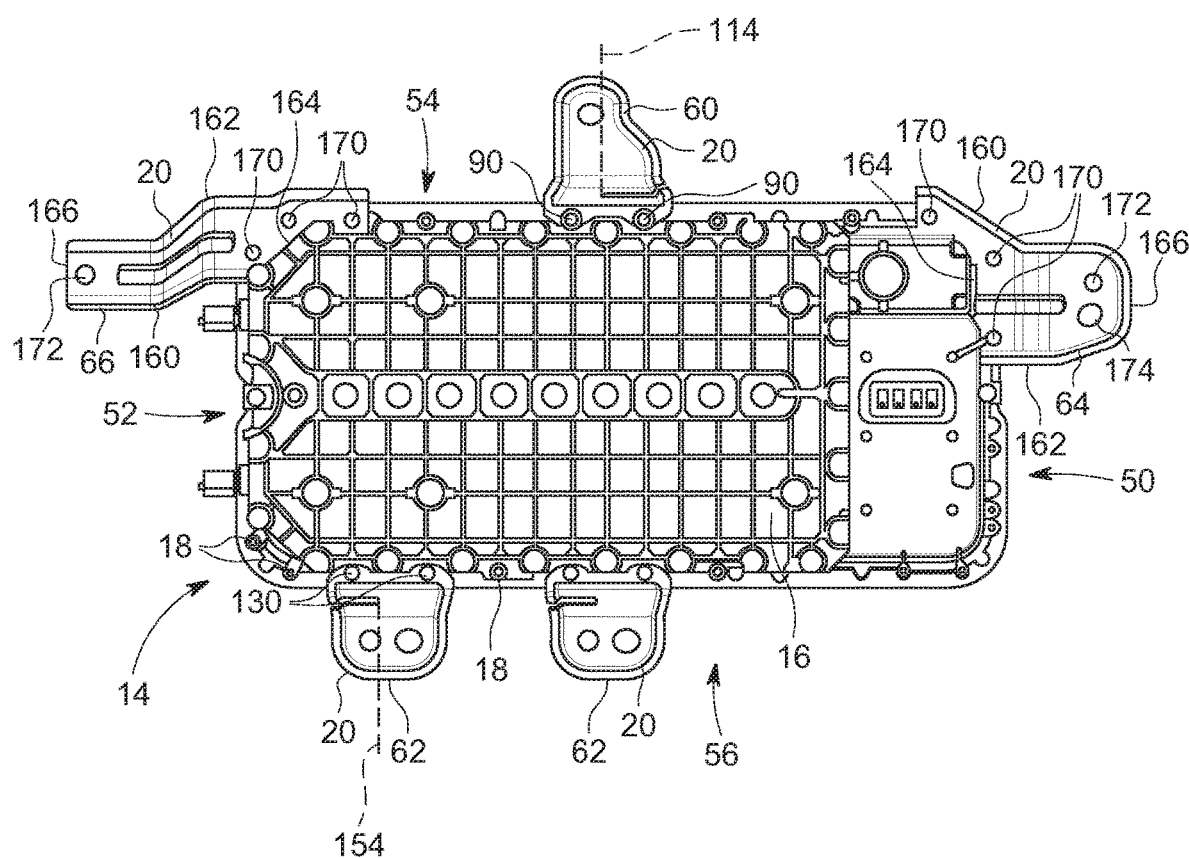
FIG. 2 is a bottom view of the battery mounting system of FIG. 1.

FIG. 1 illustrates a partial view of a vehicle 10 with a vehicle frame 12 and a vehicle battery system 14 connected to the vehicle frame 12, and FIG. 2 illustrates the battery system 14. The battery system 14 includes a battery tray 16 that is sized to receive a traction battery 17 for the vehicle 10, and may define a recess sized to receive the battery 17. The battery tray 16 may also be referred to as a housing or an enclosure.

In one example, the traction battery 17 is a battery that provides electrical power to one or more electric machines to propel the vehicle 10. The traction battery 17 may be a high voltage battery, and may be used on a hybrid vehicle, an electric vehicle, a plug-in hybrid vehicle, a micro-hybrid or mild hybrid vehicle, a fuel cell vehicle, and the like. The traction battery 17 may provide a high voltage direct current (DC) output from one or more battery cell arrays, or battery cell stacks, within the traction battery. The battery cell arrays may include one or more battery cells.

The tray 16 may be configured to structurally support the traction battery 17 relative to the frame 12 and provide a housing with stiffness and durability about the traction battery during normal vehicle operation. Further, in the event of a load applied to the battery system 14, for example a vehicle side impact, energy may be transferred from the vehicle frame 12 to the battery tray 16 and battery 17, and the tray may protect the battery as well as absorb energy from the load or impact.

The battery tray 16 defines bosses 18 for use in connecting the battery tray 16 to the vehicle. In one example, a boss 18 is provided by a projection, such as a cylindrical or other shaped projection, from the battery tray 16, with a contact face surrounding a threaded aperture sized to receive a fastener such as a bolt. In another example, a boss 18 on the tray 16 may be defined by a contact face on the main body of the tray and surrounding a threaded aperture sized to receive a fastener such as a bolt, and without a projection from the tray. In various examples, the battery tray 14 may be formed from a first material, such as an aluminum or an aluminum alloy, and may be formed as a cast aluminum battery tray. The battery tray 16 may be formed from a cast aluminum material to reduce weight for the vehicle and based on manufacturability considerations.

The battery system 14 also includes mounting brackets 20 to connect the tray 16 to the frame 12. Each bracket 20 may be formed from a second material, such as steel or an extruded aluminum. The tray 16 may therefore be more brittle than the brackets 20.

Each bracket 20 connects to one or more respective bosses 18 on the battery tray 16 and also connects to one or more mounting points 22 on the vehicle frame 12. The vehicle frame 12 may define mounting points 22 as apertures in the frame. The vehicle frame 12 may also define locating features 24, which also may be provided by apertures in the frame, to locate the bracket 20 and battery system 14 relative to the frame during installation or assembly.

FIG. 1 illustrates the battery system 14 as being connected to a vehicle frame 12 underbody or undercarriage. The vehicle frame 12 may be provided by a chassis rail system, a vehicle unibody frame, or a combination thereof. The vehicle frame 12 as oriented in FIG. 1 has a front end 30, a rear end 32, and left- and right-hand sides 34, 36 based on a normal driving configuration for the vehicle.

The battery system 14 in FIGS. 1 and 2 is positioned between one of the sides 34 and a vehicle longitudinal axis 38, and may be positioned between one of the sides 34 and a tunnel structure 40 formed by the frame 12 along the vehicle longitudinal axis 38. The tray 16 of the battery system as shown in FIGS. 1 and 2 has a front end 50 associated with the front end of the vehicle 30, a rear end 52 associated with the rear end 32 of the vehicle, an outboard side 54 associated with and adjacent to the left side 34 of the vehicle, and an inboard side 56 adjacent to the tunnel 40 or vehicle longitudinal axis 38.

In other embodiments, and as contemplated by the disclosure, the vehicle battery system 14 may be connected at another location within the vehicle 10, for example, within a rear trunk enclosure, under a vehicle passenger seat, or in another impact zone of the vehicle.

As the battery tray 16 is may be formed from a cast aluminum material, the battery tray and the associated bosses may be more brittle than the brackets 20 that are formed from a steel or extruded aluminum. As such, the bosses 18 are more likely to fracture than the brackets 20, for example, during a high load event or an impact. The brackets 20 as described herein for the battery system 14 allow the battery tray 16 to move relative to the vehicle frame 12 by selective use of flexible brackets, or slotted brackets that are designed to deform under load or impact without fracturing. As the slotted brackets 20 deform under impact, the stress imparted to the bosses 18 on the tray 16 is reduced and distributed.

The brackets 20 of the battery system 14 also sufficient stiffness for the battery system to meet the noise, vibration, and harshness requirements for the vehicle 10, as well as durability requirements. Testing has indicated that the brackets 20 according to the present disclosure meet the same NVH and durability targets as a set of conventional brackets without slots.

By using a battery system 14 with brackets 20 as described herein, the battery system may be mounted in locations on the vehicle 10 that were otherwise unavailable for locating a battery, e.g. in an impact zone, as the brackets 20 allow for the battery tray 16 and battery to remain attached to the vehicle under an impact and while reducing stress to the battery tray under load. In FIG. 1, the brackets 20 allow for the battery system 16 to be mounted within a side impact deformation zone of the vehicle. In other examples, the brackets 20 allow the battery system 14 to be mounted in other impact zones of the vehicle, thereby expanding the possible mounting locations and packaging solutions on the vehicle for the battery system. The brackets 20 may also provide for use of the battery system on multiple vehicle platforms.

As shown in FIGS. 1 and 2, the battery system 14 has multiple brackets 20, with the brackets being provided in different forms. In the example shown, the battery system 14 has a first bracket 60 along the outboard side 54, a pair of second brackets 62 along the inboard side 56, a third bracket 64 along the front end 50, and a fourth bracket 66 along the rear end 52. The brackets 20 cooperate to connect the battery tray 16 and battery to the vehicle 10. In other examples, other numbers of brackets 20 may be used, and the battery system may use a greater number or fewer number of forms or shapes of brackets. In the various examples, the battery system 14 includes at least one bracket 60, 62 with a slot and at least one bracket 64, 66 without a slot as described herein.

In the event of a side impact to the left side 34 of the vehicle 10, as indicated by arrow F, a force is imparted onto the battery tray 16 and battery and the battery tray and battery react by moving along the impact axis. As such the slotted brackets 60, 62 are positioned on the sides of the battery tray 16 that receive or intersect the impact axis and impact load, or a majority of the impact load. For the example shown and with respect to the battery tray 16 being positioned in a side impact zone as shown in FIG. 1, the slotted brackets 60, 62 are therefore positioned on the inboard and outboard sides 54, 56 of the battery tray, and the unslotted brackets 64, 66 are positioned on the front and rear ends 50, 52 of the battery tray 16.

For a side impact as described above, the bracket 60 on the side receiving the impact is compressed, and the slot allows the bracket 60 to deform leading to a crumpling of the bracket 60 and also some rotation of the bracket 60. The brackets 62 on the opposed side from the impact and along the impact axis undergo tension, and deform to elongate and stretch. Additionally, based on the impact, the tunnel section 40 may deform and crumple, causing further tension on the brackets 62 and bracket 62 deformation and elongation. Regardless of deformation of the brackets, the brackets 60, 62 are configured such that they maintain a connection between the vehicle frame 12 and the battery tray 16, and the brackets 60, 62 do not fracture, separate, or rupture during an impact, the deformation absorbs load, and the brackets 60, 62 provides stress relief and distribution of force to the tray.

In other examples, the battery system 14 may be positioned in another vehicle location, and the brackets 60, 62 may be rearranged based on an associated impact direction for that region of the vehicle.

Figure 3:
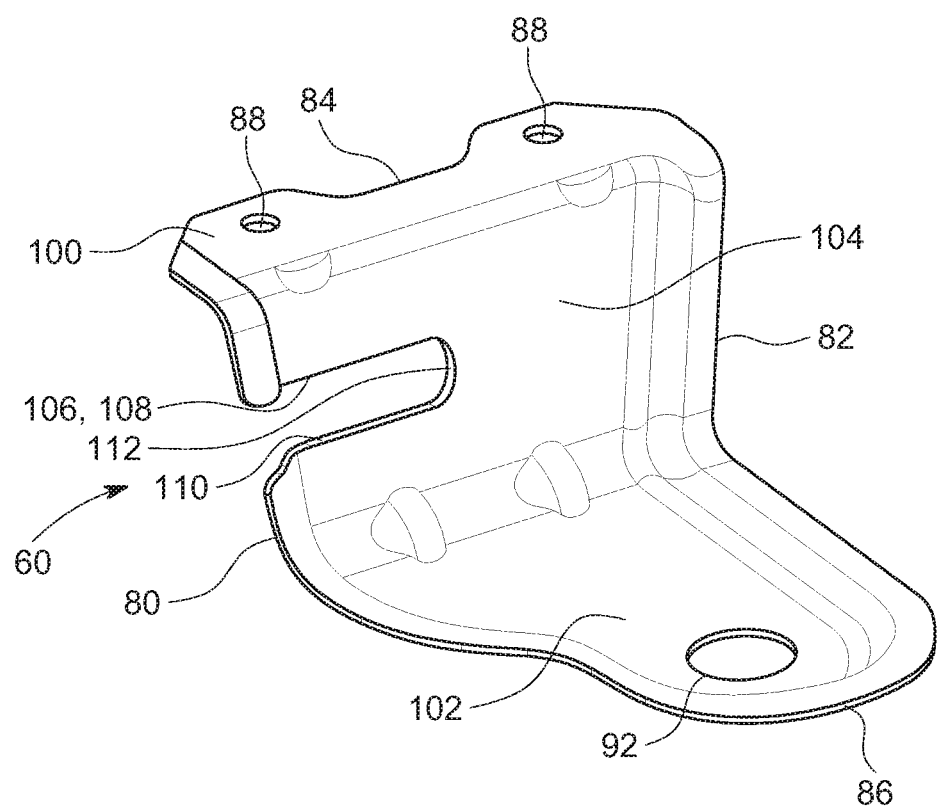
FIG. 3 is a perspective view of a first bracket according to an embodiment and for use with the battery mounting system of FIG. 1.

FIG. 3 illustrates another view of the bracket 60 in FIG. 2. The bracket 60 is provided by a member with first and second sides 80, 82 extending between first and second ends 84, 86. The bracket has at least one aperture 88 adjacent to the first end 84 to cooperate with a boss 18 on the battery tray 16. In the example shown, the bracket has first and second apertures 88, or a pair of apertures, adjacent to the first end 84 and positioned to cooperate with the first and second bosses 18 on the tray to connect the bracket to the battery tray. First and second fasteners 90, such as bolts, are provided as shown in FIG. 2. The first fastener 90 cooperates with the first boss 18 and the first aperture 88, and the second fastener 90 cooperates with the second boss 18 and the second aperture 88 to connect the bracket 60 to the battery tray 16.

The bracket 60 also defines another aperture 92, or a third aperture, adjacent to the second end 86 and positioned to cooperate with a mounting point 22 on a vehicle frame 12.

A third fastener 94, such as a bolt, is shown in FIG. 1. The third fastener 94 cooperates with the third aperture 92 and the mounting point 22 to connect the bracket to the vehicle frame. The bracket 60 may be connected to the vehicle frame 12 using only the third fastener 94. The bracket 60 is the sole bracket connected to the first and second bosses 18, e.g. the bracket does not have another component or portion.

The bracket 60 defines a first region 100 adjacent to the first end 84 and containing the first and second apertures 88. The bracket 60 also defines a second region 102 adjacent to the second end 86 and containing the third aperture 92. The bracket 60 defines a third region 104 extending between the first and second regions 100, 102 and containing a transverse slot 106. Each of the first, second, and third regions 100, 102, 104 may be substantially planar. The first and second regions 100, 102 are spaced apart and substantially parallel to one another. For purposes of this disclosure, substantially refers to being within plus or minus ten degrees of a specified orientation, or being within plus or minus five degrees of a specified orientation. The third region 104 may be angled relative to the first and second regions 100, 102, such that the bracket has an S-shape or Z-shape overall.

The bracket member 60 also defines a transverse slot 106 intersecting the first side 80 and extending towards and spaced apart from the second side 82. The transverse slot 106 is positioned between the first and third apertures 88, 92. In one example, and as shown, the transverse slot 106 is defined by first and second side walls 108, 110 connected by an end wall 112. The first and second side walls 108, 110 intersect the first side 80 of the bracket. The first and second side walls 108, 110 of the transverse slot may be parallel to one another. Furthermore, the first and second side walls 108, 110 of the transverse slot may be perpendicular or substantially perpendicular to the first side 80 of the bracket in the region of their intersection therewith.

The end wall 112 of the transverse slot is formed by a continuous concave curve extending between the first and second side walls 108, 110 according to the example shown. In one example, the curve may have a constant radius of curvature along its length, with the first and second sides 108, 110 of the transverse slot smoothly blending into the end wall 112 or extending tangentially to the end wall. The transverse slot 106 may extend across the bracket 60 such that the end wall 112 of the transverse slot is in alignment with an edge of the third aperture 92 closest to a longitudinal axis 114 of the bracket or the edge of the aperture 92 farthest from the second side 82. In other examples, the transverse slot 106 may have another shape, and extend across another percentage of the width of the bracket 60.

Figure 4:
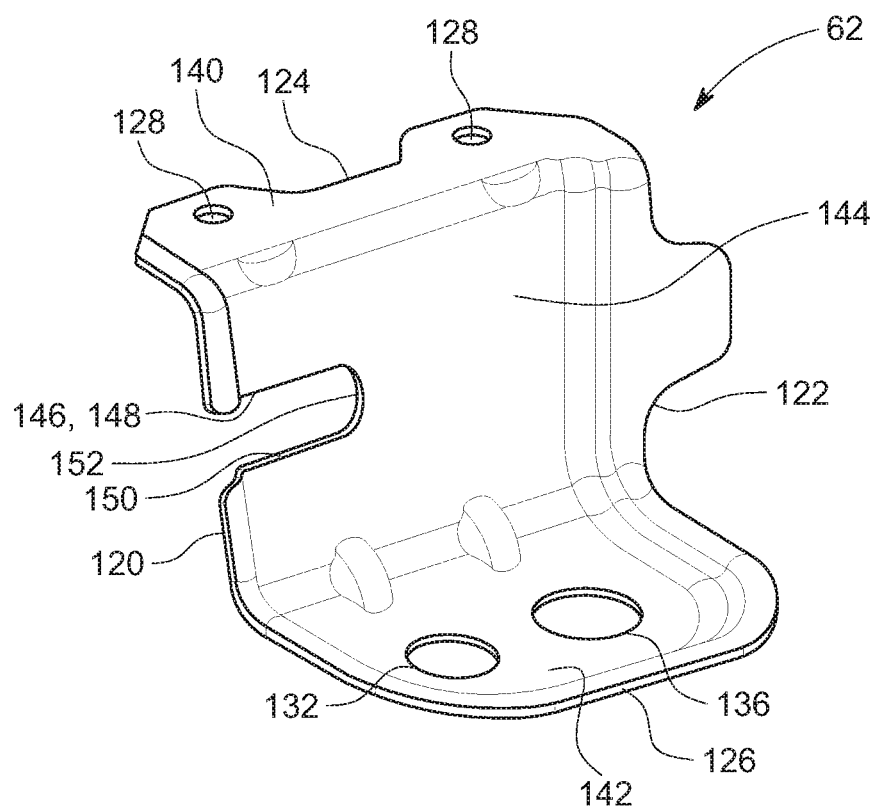
FIG. 4 is a perspective view of a second bracket according to an embodiment and for use with the battery mounting system of FIG. 1.

FIG. 4 illustrates another view of the bracket 62 in FIG. 2. The bracket 62 is provided by a member with first and second sides 120, 122 extending between first and second ends 124, 126. The bracket has at least one aperture 128 adjacent to the first end 124 to cooperate with a boss 18 on the battery tray. In the example shown, the bracket 62 has first and second apertures 128, or a pair of apertures, adjacent to the first end 124 and positioned to cooperate with a pair of bosses 18 on the tray to connect the bracket to the battery tray. A pair of fasteners 130, such as bolts, are provided as shown in FIG. 2 and cooperate with the bosses 18 and first and second apertures 128 to connect the bracket 62 to the battery tray 16.

The bracket 62 also defines another aperture 132, or a third aperture, adjacent to the second end 126 and positioned to cooperate with a mounting point 22 on a vehicle frame 12. A third fastener 134, such as a bolt, is shown in FIG. 1. The third fastener 134 cooperates with the third aperture 132 and the mounting point 22 to connect the bracket 62 to the vehicle frame 12. The bracket 62 may be connected to the vehicle frame 12 using only the third fastener 134. The bracket 62 is the sole bracket connected to the first and second bosses 18, e.g. the bracket does not have another component or portion.

The bracket 62 also defines a fourth aperture 136 positioned adjacent to the second end 126 and adjacent to the third aperture 132. The fourth aperture 136 is sized to locate the bracket 62 relative to the vehicle frame 12 by way of a locating feature 24 on the vehicle frame. The fourth aperture 136 may be provided with a non-circular shape in some examples.

The bracket 62 defines a first region 140 adjacent to the first end 124 and containing the first and second apertures 128. The bracket 62 also defines a second region 142 adjacent to the second end 126 and containing the third aperture 132 and the fourth aperture 136. The bracket 62 defines a third region 144 extending between the first and second regions 140, 142 and containing a transverse slot 146. Each of the first, second, and third regions 140, 142, 144 may be substantially planar. The first and second regions 140, 142 are spaced apart and substantially parallel to one another. The third region 144 may be angled relative to the first and second regions, such that the bracket has an S-shape or Z-shape overall.

The bracket member 62 also defines a transverse slot 146 intersecting the first side 120 and extending towards and spaced apart from the second side 122. The transverse slot 146 is positioned between the first and third apertures 128, 132. In one example, and as shown, the transverse slot 146 is defined by first and second side walls 148, 150 connected by an end wall 152. The first and second side walls 148, 150 intersect the first side 120 of the bracket. The first and second side walls 148, 150 of the transverse slot may be parallel to one another. Furthermore, the first and second side walls 148, 150 of the transverse slot may be perpendicular or substantially perpendicular to the first side 120 of the bracket in the region of their intersection therewith.

The end wall 152 of the transverse slot 146 is formed by a continuous concave curve extending between the first and second side walls 148, 150 according to the example shown. In one example, the curve may have a constant radius of curvature along its length, with the first and second sides 148, 150 of the transverse slot smoothly blending into the end wall 152 or extending tangentially to the end wall. The transverse slot 146 may extend across the bracket 62 such that the end wall 152 of the transverse slot is in alignment with an edge of the third aperture 132 closest to a longitudinal axis 154 of the bracket or the edge of the third aperture to the second side 122 and fourth aperture 136. In another example, the transverse slot 146 extends across the bracket such that the end wall 152 of the transverse slot is positioned between the third and fourth apertures 132, 136. In other examples, the transverse slot 146 may have another shape, and extend across another percentage of the width of the bracket.

Referring back to FIG. 2, the third and fourth brackets 64, 66 are connected to the front and rear ends 50, 52 of the battery tray 16, respectively. The third and fourth brackets 64, 66 are provided on sides of the battery tray 16 that are not associated with a load path or impact path F. Each of the third and fourth brackets 64, 66 has first and second sides 160, 162 extending between first and second ends 164, 166. Each of the third and fourth brackets 64, 66 is without a transverse slot or other cutout or relief section to provide a deformation zone on the bracket. In other examples, more than one bracket per associated side may be used.

Each of the third and fourth brackets 64, 66 defines at least one aperture 170 adjacent to the first end 164 and positioned to cooperate with at least one boss 18 on the battery tray to connect the bracket to the battery tray. In the example shown, each of the third and fourth brackets 64, 66 defines three apertures 170 adjacent to the first end to connect to three bosses, respectively, via fasteners. In other examples, each of the third and fourth brackets may be provided with a pair of apertures 170 adjacent to the first end.

Each of the third and fourth brackets 64, 66 also defines an aperture 172 adjacent to the second end 166 and positioned to cooperate with a mounting point 22 on the vehicle frame to connect the bracket to the vehicle frame. The aperture 166 may provide the sole mounting point for the bracket 64, 66 to the vehicle frame. One or both of the brackets may additionally be provided with an additional aperture 174 sized to locate the bracket relative to the vehicle frame by way of a locating feature 24 on the vehicle frame. The additional aperture 174 may be provided with a non-circular shape in some examples. The additional aperture 174 does not receive a fastener when the bracket is connected to the vehicle frame 12.

The battery system 14 and associated brackets 20 allow for mounting of a traction battery 17 on a vehicle 10 that meets NVH and durability requirements, while also allowing for greater availability of packaging locations on the vehicle, including within or near an impact zone. The combination of slotted and unslotted brackets 60, 62, 64, 66 helps to retain the battery tray 16 and battery to the vehicle frame 12 under a load such as an impact load. Additionally, the slotted brackets 60, 62 allow for movement in the battery tray relative to the vehicle frame under a load or force, and the slotted regions provide a deformation zone that allows for elongation or crumpling of the bracket without the bracket fracturing or the battery tray bosses fracturing, thus maintaining a continuous connection between the vehicle frame and the battery tray. The bosses 18 on the battery tray may be formed from a material that is more brittle than the brackets 20, such as a cast aluminum tray and a steel or extruded aluminum bracket. The slotted brackets 60, 62 disrupt the direct load path from vehicle frame 12 fastener to the tray boss 18 fastener, and provides stress relief on the associated boss 18. The slots in the brackets 60, 62 provide stress relief for and movement of the battery tray, while the unslotted brackets 64, 66 away from the load path F provide a secure connection between the frame 12 and the tray 16.

The brackets 20 each have greater number of apertures to mount the bracket to the battery tray 16 than apertures to mount the bracket to the vehicle frame 12. A load from the vehicle frame 12 to the bracket 20 is therefore distributed across multiple fasteners at the battery tray 16 end, and further lowers the load and stress on each of the battery tray bosses 18.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A vehicle battery system comprising:
   a battery tray sized to receive a traction battery and defining first and second bosses; and
   a bracket with first and second sides extending between first and second ends, the bracket defining first and second apertures adjacent to the first end and positioned to cooperate with the first and second bosses to connect the bracket to the battery tray, the bracket defining a third aperture adjacent to the second end and positioned to cooperate with a mounting point on a vehicle frame, the bracket defining a transverse slot intersecting the first side and extending towards the second side, the transverse slot positioned between the first and third apertures.

2. The vehicle battery system of claim 1 wherein the transverse slot is defined by first and second side walls connected by an end wall, the first and second side walls intersecting the first side of the bracket.

3. The vehicle battery system of claim 2 wherein the end wall of the transverse slot extends to be in alignment with an edge of the third aperture closest to a longitudinal axis of the bracket.

4. The vehicle battery system of claim 2 wherein the end wall is formed by a continuous concave curve extending between the first and second side walls.

5. The vehicle battery system of claim 2 wherein the first and second side walls are substantially parallel to one another, and are substantially perpendicular to the first side of the bracket.

6. The vehicle battery system of claim 1, further comprising first and second fasteners, the first fastener cooperating with the first boss and the first aperture and the second fastener cooperating with the second boss and the second aperture to connect the bracket to the battery tray; and
   a third fastener, the third fastener cooperating with the third aperture and the mounting point to connect the bracket to the vehicle frame.

7. The vehicle battery system of claim 6 wherein the bracket connected to the vehicle frame using only the third aperture.

8. The vehicle battery system of claim 7, wherein the bracket defines a fourth aperture positioned adjacent to the second end, the fourth aperture sized to locate the bracket relative to the vehicle frame.

9. The vehicle battery system of claim 1 wherein the battery tray is formed from a cast aluminum material; and
   wherein the bracket is formed from a steel material.

10. The vehicle battery system of claim 1 wherein the bracket defines a first region adjacent to the first end and containing the first and second aperture, a second region adjacent to the second end and containing the third aperture, and a third region extending between the first and second regions and containing the transverse slot, wherein the first and second regions are spaced apart and substantially parallel to one another.

11. The vehicle battery system of claim 1 wherein the bracket is the sole bracket connected to the first and second bosses.

12. A vehicle comprising:
    a vehicle frame defining first and second mounting points;
    a battery tray sized to receive a traction battery and defining a first pair of bosses and a second pair of bosses;
    a first bracket with first and second sides extending between first and second ends, the first bracket defining a pair of apertures adjacent to the first end and positioned to cooperate with the first pair of bosses to connect the bracket to the battery tray, the first bracket defining another aperture adjacent to the second end and positioned to cooperate with the first mounting point, the first bracket defining a transverse slot intersecting the first side and extending towards the second side, the transverse slot positioned between the pair of apertures and the another aperture; and a second bracket with first and second sides extending between first and second ends, the second bracket defining a pair of apertures adjacent to the first end and positioned to cooperate with the first pair of bosses to connect the bracket to the battery tray, the second bracket defining another aperture adjacent to the second end and positioned to cooperate with the second mounting point.

13. The vehicle of claim 12, wherein the battery tray is connected to the vehicle frame such that the battery tray defines inboard and outboard sides extending between front and rear sides; and wherein the first pair of bosses is directly adjacent to one of the inboard and outboard sides.

14. The vehicle of claim 13 wherein the second pair of bosses is directly adjacent to one of the front and rear sides; and wherein the second bracket is without a transverse slot.

15. The vehicle of claim 13 wherein the second pair of bosses is directly adjacent to the other of the inboard and outboard sides; and wherein the second bracket defines a transverse slot intersecting the first side and extending towards the second side, the transverse slot positioned between the pair of apertures and the another aperture.

16. A mounting bracket for a traction battery tray, the mounting bracket comprising a member with first and second sides extending between first and second ends, the member defining a pair of apertures adjacent to the first end to connect the member to a battery tray, another aperture adjacent to the second end to connect the member to a vehicle frame, and a transverse slot intersecting the first side and extending towards the second side.

17. The mounting bracket of claim 16 wherein the transverse slot is positioned between the pair of apertures and the another aperture, the transverse slot defined by first and second side walls connected by an end wall, the first and second side walls intersecting the first side of the member; and wherein the end wall of the transverse slot extends to be in alignment with an edge of the another aperture closest to a longitudinal axis of the member.

18. The mounting bracket of claim 17 wherein the first and second side walls are substantially parallel to one another, and are substantially perpendicular to the first side of the member; and wherein the end wall is formed by a continuous concave curve extending between the first and second side walls.

19. The mounting bracket of claim 16 wherein the member further defines a fourth aperture positioned adjacent to the second end and configured to locate the bracket relative to the vehicle frame.

20. The mounting bracket of claim 16 wherein the member defines a first region adjacent to the first end and containing the pair of apertures, a second region adjacent to the second end and containing the another aperture, and a third region extending between the first and second regions and containing the transverse slot, wherein the first and second regions are spaced apart and substantially parallel to one another.

* * * * *